Aug. 19, 1958 J. R. HUBER 2,848,259
CHAIN SECURING APPARATUS
Filed Feb. 7, 1956
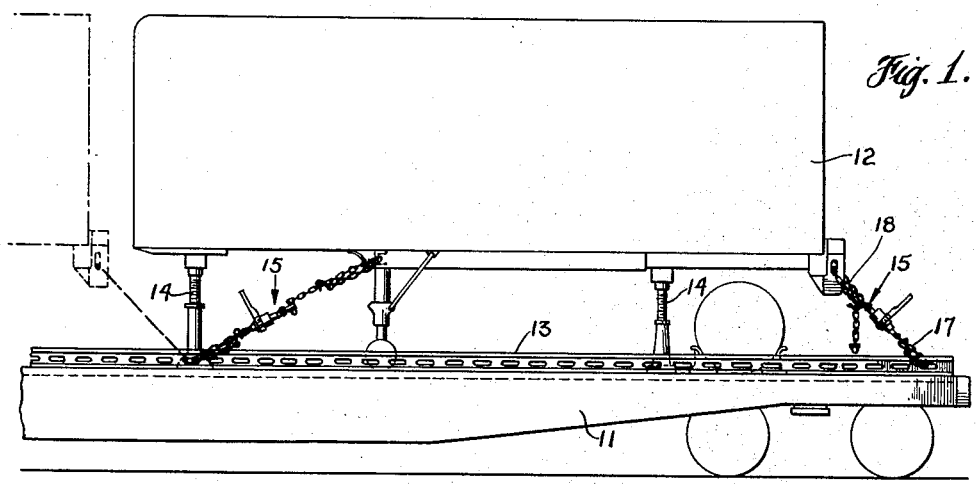
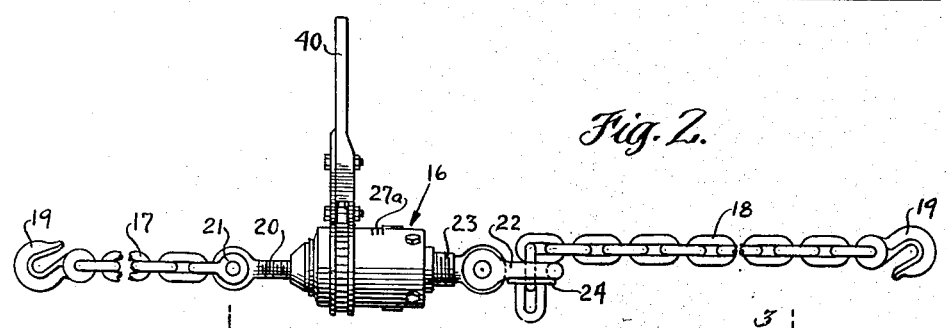
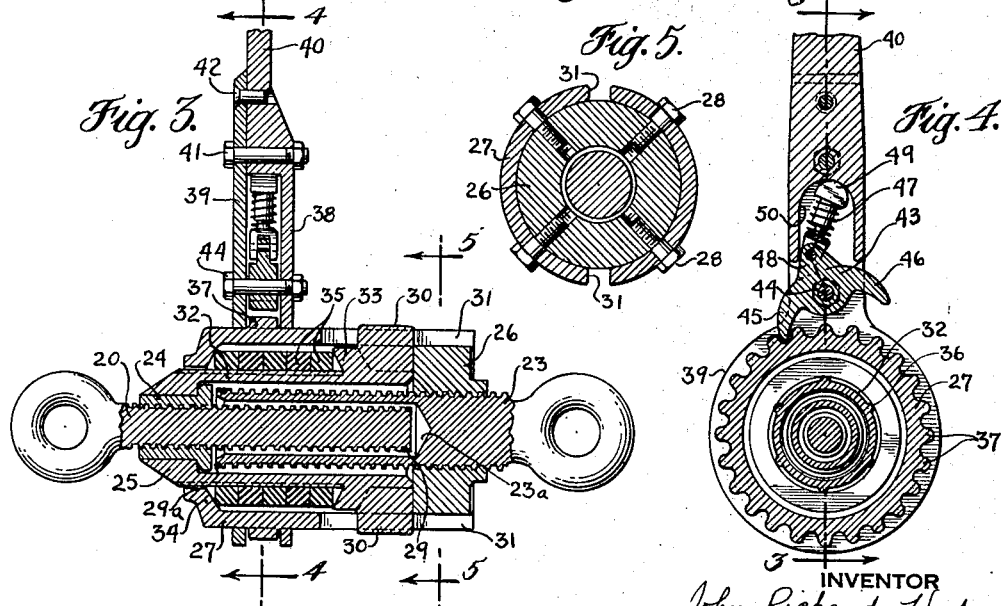
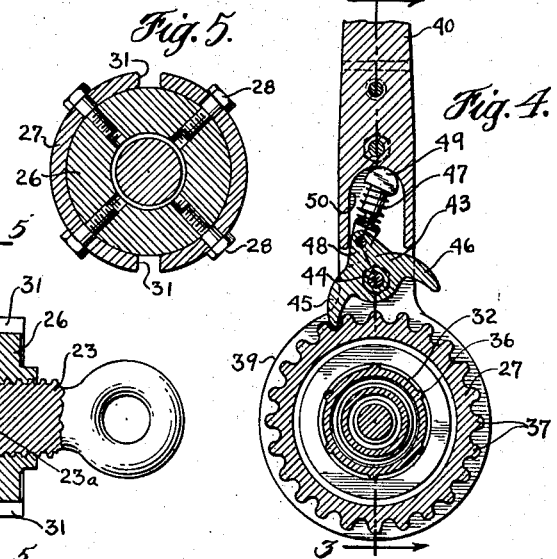
INVENTOR
John Richard Huber
BY
Harris S. Campbell
ATTORNEY

United States Patent Office 2,848,259
Patented Aug. 19, 1958

2,848,259

CHAIN SECURING APPARATUS

John Richard Huber, Warrington, Pa., assignor to Eastern Rotorcraft Corporation, Doylestown, Pa., a corporation of Pennsylvania Application February 7, 1956, Serial No. 564,033

7 Claims. (Cl. 287—60)

This invention relates to chain securing devices and is particularly concerned with adjusting and tightening mechanism for use with chains used in securing heavy equipment.

When transporting heavy equipment such as trucks, trailers, military equipment and the like, on railroad cars or ships, it is necessary that the equipment be firmly anchored to the transporting vehicle. One of the main objects of the present invention is the provision of a chain securing and adjusting device having means for applying initial tension in the chain.

A more specific object of the invention is the provision of a turnbuckle type tightening device incorporating relatively long travel threaded members to permit a large amount of take-up. These members are arranged inside a housing to telescope with respect to each other for the purpose of reducing the overall length of the tightening unit to provide a relatively short, compact unit.

Another object of the invention is the provision of a turnbuckle type construction in which at least one of the threaded members is supported in a female nut member which may be attached to the supporting housing as a separate unit. With this construction the ends of the threaded members are accessible after assembly so that they can be readily provided with a thread stop to prevent inadvertent unscrewing during operation.

A further object of the invention is the provision of a compressible device supported in the housing of the unit in an annular chamber. This device provides for deformation under load to give cushioning action as well as to give a visual indication of the amount of initial tensioning applied to the unit. The annular arrangement keeps the overall length of the unit to a minimum.

How the foregoing and other objects and advantages are obtained will be clear from the following description of the drawings in which—

Figure 1 illustrates one manner in which the present device may be applied for securing a trailer vehicle to a railroad car.

Figure 2 shows a side view of the chain securing assembly.

Figure 3 shows an enlarged longitudinal section through the mechanical adjusting and tightening device of the chain securing assembly.

Figure 4 is a sectional view taken in the direction of arrows 4—4, Figure 3, showing the handle and ratchet mechanism.

Figure 5 is a sectional view taken in the direction of arrows 5—5, Figure 3, showing the construction of the removable nut portion and its manner of assembly.

Figure 1 illustrates a typical application of the chain securing device of the present invention. A railroad car 11 is equipped to transport truck trailer vehicle 12. Perforated rail members 13 are provided on the railroad car 11 for guiding and anchoring trailer vehicle 12 for transport on the railroad car. Rigid jacks 14 are usually used to support the frame of the trailer 12 rigidly to remove the spring action of the trailer vehicle springs. After insertion of the jacks 14 at the front and rear ends of the vehicle the chain securing devices are then applied to securely fasten vehicle 12 to the railroad car 11. A chain tie down unit 15 is illustrated extending from the vehicle at its rear end to the rail 13 and another tie down unit 15 is shown attached at the forward end of the frame of vehicle 12. Two or more of these tie downs are normally used at each end of the vehicle disposed in angular relationship to securely fasten the vehicle 12 against shift in position on car 11.

Tie down assembly 15 is composed of the mechanical adjusting and tensioning unit 16, anchor chain portion 17 and adjustable chain portion 18. These parts are more clearly illustrated in Figure 2 where it will be seen that each chain portion 17 and 18 is provided with a grab hook 19 at the end. Anchor chain member 17 may be attached to the threaded member 20 by any suitable means such as shackle 21. Another shackle 22 is shown connecting chain 18 to threaded adjusting member 23. Stop plate 24 prevents chain 18 from being removed from shackle 22 but permits the chain to be slipped through the shackle 22 for adjustment purposes when desired.

The details of construction of the mechanical adjusting and tightening unit is shown more clearly in Figures 3, 4, and 5. In Figure 3 it will be seen that adjustable shank member 20 is threaded into female nut portion 24 which is rigidly attached to the inner housing part 25. Threaded adjustment part 23 has a thread of opposite hand to the thread of member 20 and engages the female threaded nut part 26 which in turn is supported in the outer housing part 27. Figure 5 clearly shows that nut part 26 is supported in position in the housing 27 by means of radially disposed bolts 28. This method of assembly permits access to the ends of the threaded parts 20 and 23 after they are screwed into position in their respective female threaded parts 24 and 26 and before nut 26 is assembled into housing 27. Thus before final assembly a suitable stop such as some weld deposited as shown at 29 on shank 20 and at 29a on threaded part 23. Once this stop has been applied to the thread of parts 20 and 23 they cannot be removed from their nuts 24 and 26 and thus the danger of unscrewing the turnbuckle unit to a degree where it can no longer hold its load is eliminated.

It will be noted in Figure 3 that extension members 30 are supplied attached to the inner housing portion 25. These radially extending parts engage in the slots 31 in the outer housing part 27. This construction permits relative motion longitudinally between the two portions 25 and 27 of the housing but prevents rotational motion between these two portions of the housings. It will be noted in Figure 3 that the diameter of threaded member 20 is considerably smaller than the diameter of threaded member 23. Member 23 is provided with an internal cylindrical recess 23a having a diameter large enough to accommodate threaded member 20. With this construction the member 20 may telescope inside the member 23 when they are in retracted position and thus reduce greatly the overall length required for the supporting housing.

It will be noted that inner housing 25 has a cylindrical portion 32 extending along a major portion of its length and terminating at the annular flange 33. The external housing 27 is generally cylindrical in shape and terminates at one end with an inwardly directed flange 34. The inside diameter of housing 27 fits over the outside of the annular flange 33 so that when the two portions 25 and 27 of the housing are in assembled relationship an annular space is provided between cylindrical portion 32 of the inside housing and the outside housing. This annular space between the two housing parts extending between flanges 33 and 34 provides for supporting the annular resilient washers 35 which are mounted between the two flanges. These washers or annular discs 35 may be fabricated from reinforced rubber impregnated fabric material which has slight resilient characteristics and is capable of withstanding high pressures. In order to retain annular discs 35 spaced slightly from the cylindrical portion 32 small longitudinal ribs 36 are provided on the housing 25 (see Fig. 4). Also it will be noted that there is annular space outside the discs 35. This manner of supporting the discs permits radial expansion under longitudinally applied loads. Thus the discs may expand both radially inwardly and radially outwardly under the compression loads. It will be noted that flanges 33 and 34 are disposed at an angle to the surface of the discs thereby providing for greater relative deflection under the initial loadings as compared to the relative deflection under high loading. Thus as the load is applied to the unit the longitudinal deformation of the discs 35 permits relative movement of the two portions of the housings 25 and 27. The amount of relative movement between the housing parts can be noted by the position of key member 30 in slots 31. In Figure 2 it will be noted that there are small indicating marks 27a which provide a visual indication of the amount of initial tension load applied to the chain. Thus the operator while tightening the chain can accurately control the amount of tensioning being applied.

As mentioned above one of the threaded members 20, 23 has a left hand thread and the other has a right hand thread. Thus rotation of the housing unit 25, 27 with respect to the threaded members causes either extension or retraction of the threaded members with respect to the housing. In order to provide the operator with powerful means for accomplishing the rotation of the housing, tooth projections 37 are provided around the periphery of the housing. Handle supporting members are mounted with plate 38 on one side of teeth 37 and plate 39 on the other side of teeth 37. In this way the teeth provide a guide to support the handle in rotational position with respect to the housing. Handle 40 is attached to the plate 38 and plate 39 is connected to the handle 40 and plate 38 by means of bolt 41 and pin 42. In order to provide ratchet operation of the handle and the housing, ratchet dog 43 is supported between the plates 38 and 39 by means of pivot bolt 44. Ratchet dog 43 incorporates leg 45 and leg 46. As shown in Figure 4 dog leg 45 is in engaged position with the teeth 37 and it will be noted that movement of the handle in a counter-clockwise direction will cause rotation of the housing 27 with the handle. Rotation of the handle in the opposite direction, that is, clockwise, permits dog 45 to jump over the teeth 37 and thus move back without turning the housing 27. This action is permitted by compression spring 47 which is pivoted to the dog projection 48. Spring 47 is supported on member 49 having a curved surface to engage the end of recess 50 in the handle 40. When it is desired to rotate housing 27 in the opposite direction, that is, in the clockwise direction, toggle member 43 is moved to the opposite side of dead center by the operator pressing dog leg 46 and moving it down into engaged position against teeth 37. In this position spring 47 applies its force to the opposite side of the pivot 44 and ratchet action of the handle 40 to turn housing 27 in the clockwise direction is permitted.

In applying the device the operator first extends threaded members 20 and 23 to their outermost position by rotating barrel housing 27 in the extending direction. The anchor chain 17 is then attached to the securing point by passing through anchoring hole or ring and connecting grab hook 19 in a convenient link. The other chain 18 may then be connected to a suitable attaching fitting on the vehicle or article to be tied down. One convenient method is to pass chain 18 through the supporting ring or bracket and bring the end with grab hook 19 on it around and pull it taut by hand when the grab hook is connected into the nearest convenient link. This system of connecting is shown at the forward portion of the vehicle 12 at the left hand side of Figure 1. Where a short coupled condition is required such as shown at the right hand end of Figure 1 the chain 18 may be used double and grab hook 19 connected around to the other end of the chain to form a complete loop with the loose end of the chain hanging as shown. In either case when the unit has been located in position with the looseness removed to the nearest convenient link, the operator then rotates handle 40 with the ratchet set for the tightening condition and thus removes slack and imparts initial tension in the chain. The adjustment is continued until the indicating marks 27a show that the chain has been tightened to the desired degree of tautness. For example, an initial tension of 2000 lbs. load may be applied to the chain. At this point key members 30 will be close to the bottom of slot 31 so that any appreciable load developed during transit will bottom the housing without much additional deflection. Small loads in transit such as vibration are cushioned and the indicator provides a convenient arrangement for the inspection of the units to determine that the tension initially applied has not slackened off. To release the tie down units the ratchet is set for extension or loosening rotation and handle 40 moved to provide release of the load from the chain. When a slight amount of slack has been produced in this fashion the grab hook may be released and the chain disconnected from the load.

From the foregoing it will be evident that I have provided an improved chain adjusting and tightening device for use in securing heavy articles and which is capable of transmitting large loads and withstanding rigorous use. By the use of telescoping screw thread members it will be clear that considerable reduction in length is possible in the housing of the turnbuckle unit. Also by providing an inner and outer annular housing arrangement the deformable discs can be incorporated in the unit itself without increasing the effective length of the mechanism. The use of a demountable nut device permits not only ready disassembly of the unit but allows access to the inner ends of the threaded members to provide them with safety stops which prevent inadvertent withdrawal of threaded members from the barrel portion of the turnbuckle unit. By the simple load indicator the operator is given immediate information as to the proper degree of tightening. The attachment of the connecting chain by a load stop plate gives a versatile connecting arrangement in which either a long connection may be made using the chain in single acting relationship or a short connection where the chain is used in looped relationship with the unused portion extending beyond the grab hook. The compact construction provides a high capacity unit which may be used in relatively restricted space where a short tie is needed.

I claim:

1. Tensioning apparatus incorporating a turnbuckle device having an inner elongated cylindrical threaded member, an outer tubular member threaded on the external surface proportioned to fit around the inner threaded member, an inner cylindrical housing having a female thread at one end to engage the thread of the inner cylindrical threaded member, an outer housing having a generally cylindrical shape proportioned to provide encirclement of the inner housing with an annular space between, a projection at one end of said inner housing, said outer housing having a slot engaging the projection of the said inner housing to prevent relative rotation between the housings, a threaded terminal member to fit the outer cylindrical threaded member and engaging the outer housing member, a resilient device mounted in the annular space between the inner and outer housing members to provide for longitudinal displacement between said housings when load is transferred across the device.

2. A construction in accordance with claim 1 in which the resilient device is in the form of multiple compressible rings.

3. Tensioning apparatus incorporating a turnbuckle device having an inner elongated cylindrical threaded member, an outer tubular member threaded on its external surface and proportioned to fit around the inner threaded member in telescoping relationship, an inner housing part having a female thread engaging the thread of one of said threaded members, an outer housing part surrounding a major portion of said inner housing part and having a threaded portion engaging the thread of the other of said threaded members, a resilient ring assembly located inside said outer housing part and encircling said inner housing part, a flange attached to each of said housing parts to engage the said ring assembly to permit longitudinal displacement between said parts when load is transferred through the device.

4. Tensioning apparatus incorporating a turnbuckle device having an inner elongated cylindrical threaded member, an outer tubular member threaded on the external surface and proportioned to fit around the inner threaded member, an inner housing part connected to one of said threaded members by a female threaded portion, an outer housing part connected to the other of said threaded members by a female threaded portion, a plurality of radially disposed threaded elements connecting one of said threaded portions to its housing part, annular resilient ring assembly surrounding a portion of the inner housing and engaging the inner and outer housing parts to provide for transmission of longitudinal forces therebetween, said annular assemblies providing for longitudinal displacement movement between the parts of the housing, and coacting stop means on said housing parts to prevent relative longitudinal motion beyond a predetermined amount.

5. A turnbuckle device having a cylindrical threaded member, a tubular threaded member proportioned to fit over said cylindrical threaded member, the thread on said tubular member being opposite hand to that of the cylindrical threaded member, an inner housing part having an inturned threaded part at one end engaging said cylindrical threaded member, said housing part having an annular flange toward the other end thereof, an outer housing part having an inside diameter to fit over said annular flange, said outer housing part having an inturned flange, a female threaded part engaging said tubular threaded member and being attached to said outer housing part at the end opposite the inturned flange and resilient ring structure proportioned to fit around said inner housing part and inside said outer housing part and supported between the flanges of said housing parts.

6. A turnbuckle device having right and left hand threaded members, a body having two parts, one of said body parts being connected by a female thread to one of said threaded members and the other of said body parts being connected to the other of said threaded members, one of said body parts being larger in diameter than the other to provide an annular space between them, a resilient device supported in the annular space, abutments attached to said body parts and engaging said resilient device and a radial projection attached to one of said body parts, the other of said body parts having a slot engaging said projection to prevent relative rotation therebetween.

7. A construction in accordance with claim 4 in which said coacting stop means are in the form of radial projections attached to the inner housing part, each projection engaging a corresponding slot in said outer housing part to prevent relative rotation between said housing parts.

References Cited in the file of this patent
UNITED STATES PATENTS

| | | |
|---|---|---|
| 716,633 | Hains et al. | Dec. 23, 1902 |
| 789,071 | Schroer | May 2, 1905 |
| 2,420,364 | Espenas | May 13, 1947 |
| 2,673,632 | Stiranka | Mar. 30, 1954 |